United States Patent
La Vanchy

[15] 3,677,579
[45] July 18, 1972

[54] CONNECTIONS FOR CONDITIONED AIR DUCTS

[72] Inventor: Wayne N. La Vanchy, 2303 Ida Drive, Arnold, Mo. 63010

[22] Filed: Feb. 20, 1970

[21] Appl. No.: 13,085

[52] U.S. Cl..............................285/169, 285/369, 285/404, 285/423
[51] Int. Cl.........................................................F16l 55/00
[58] Field of Search....................285/423, 235, 424, 93, 404, 285/369, 90, 331, 169; 52/105, 282, 285, 627; 287/189.36 D

[56] References Cited

UNITED STATES PATENTS

| | | | |
|---|---|---|---|
| 2,330,763 | 9/1943 | Townsend | 287/189.36 D |
| 2,498,753 | 2/1950 | Deitsch | 285/424 X |
| 3,416,282 | 12/1968 | Dougherty | 52/627 |

FOREIGN PATENTS OR APPLICATIONS

| | | | |
|---|---|---|---|
| 906,092 | 9/1962 | Great Britain | 285/424 |

*Primary Examiner*—Dave W. Arola
*Attorney*—George J. Mager

[57] ABSTRACT

Prefabricated rigid vinyl or similar plastic connector elements adapted to facilitate the installation of an air duct system in the basement of a building and the like. Particularly although not exclusively designed for connections in duct systems of the rectangular rigid board type. The connectors serve to obviate the tedious and time-consuming grooving, shiplap and sealing operations currently required and employed.

4 Claims, 23 Drawing Figures

Patented July 18, 1972
3,677,579
3 Sheets-Sheet 1
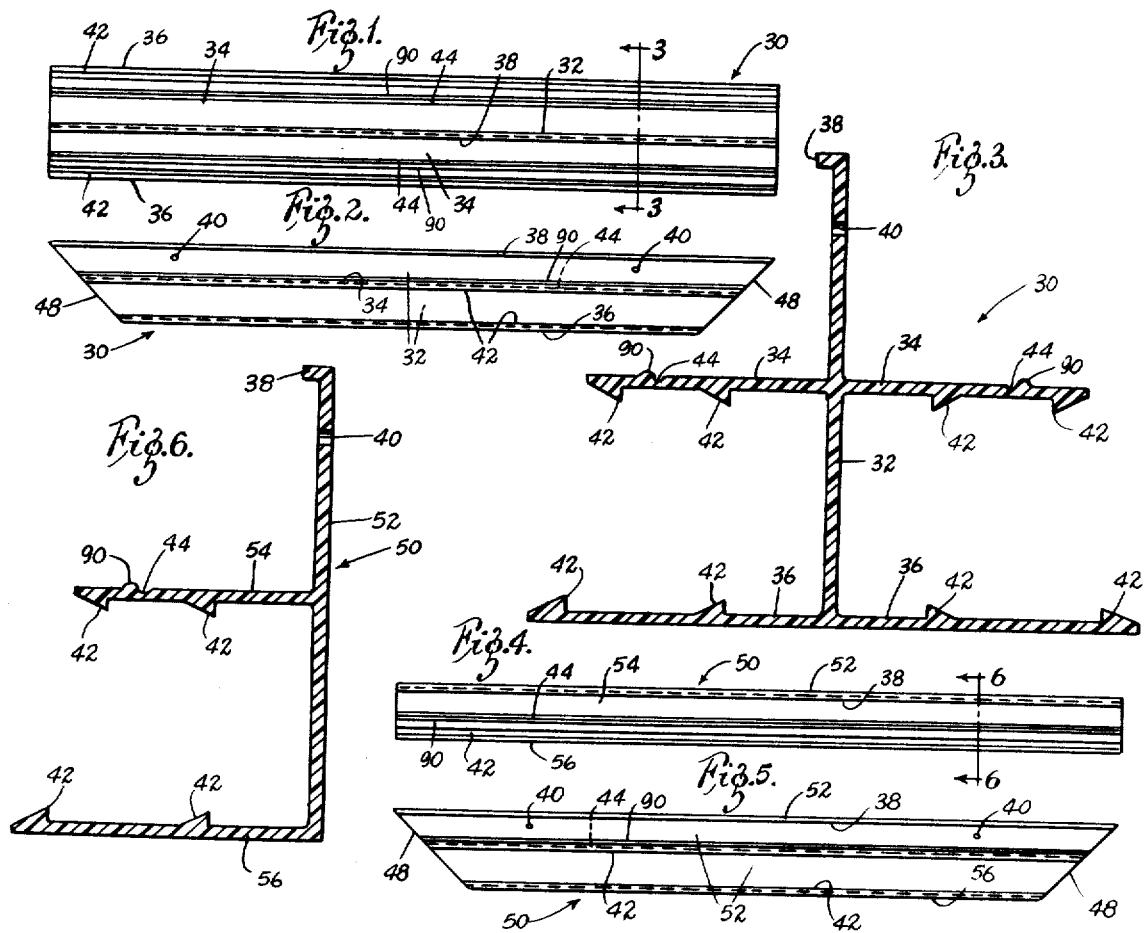
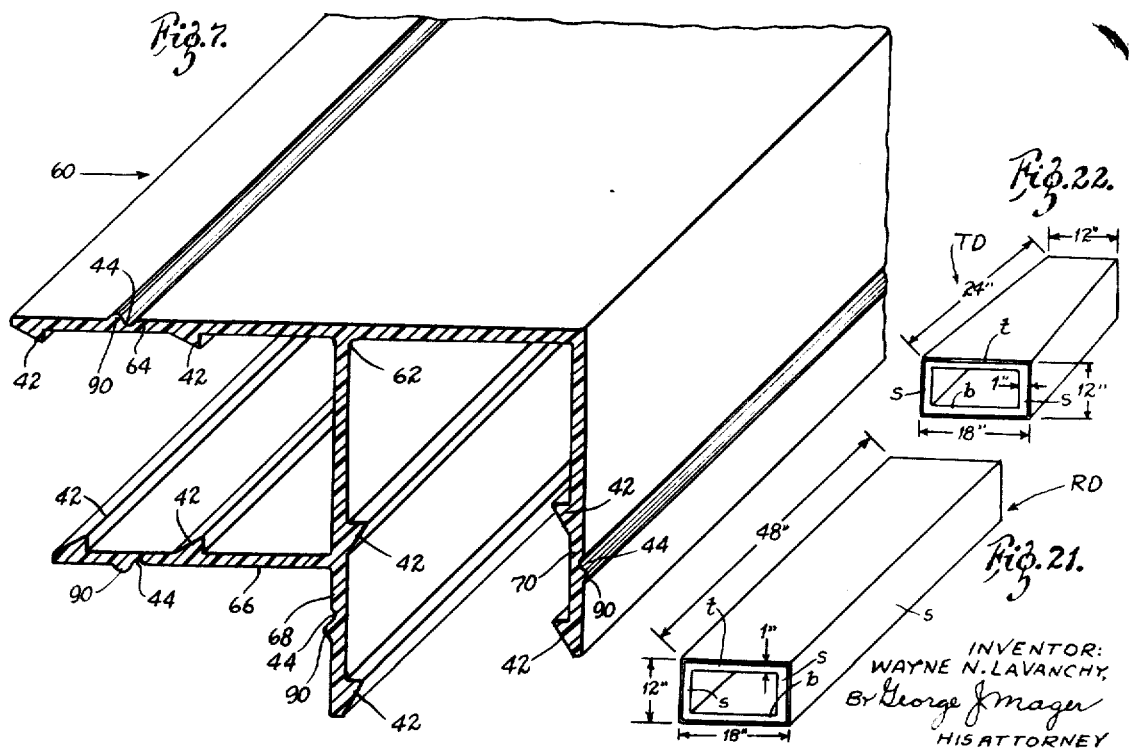
INVENTOR:
WAYNE N. LAVANCHY,
By George J Mager
HIS ATTORNEY

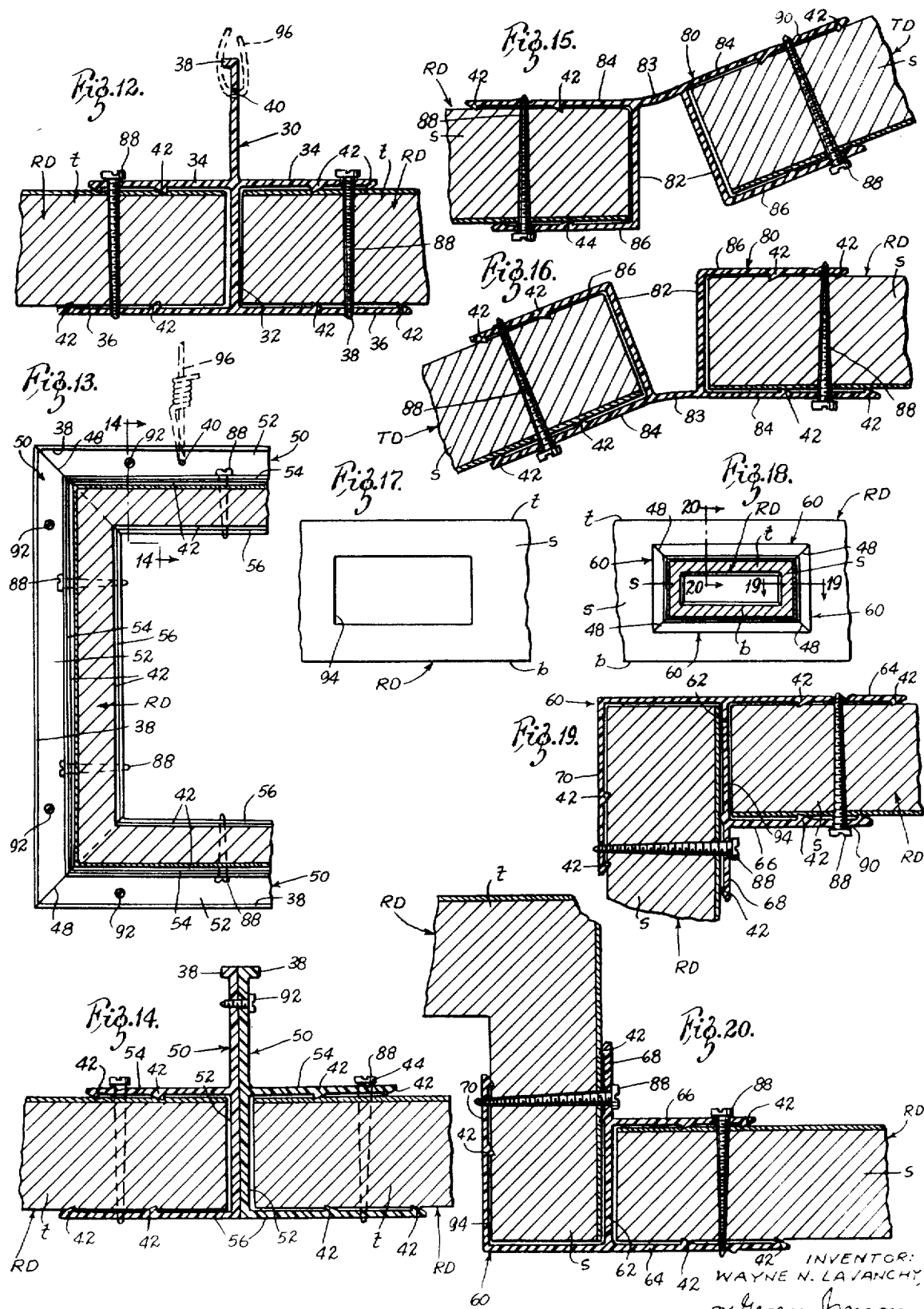

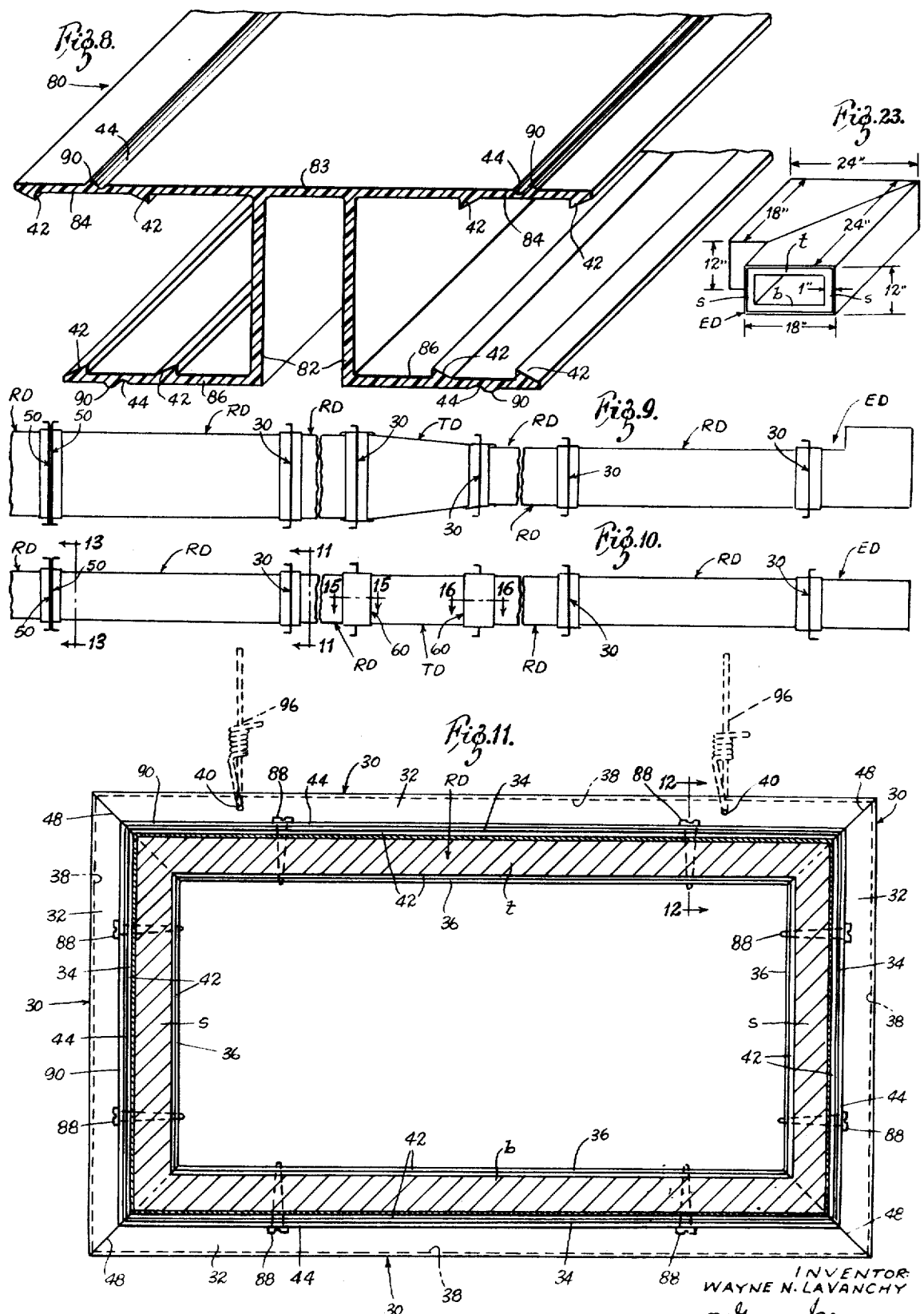

CONNECTIONS FOR CONDITIONED AIR DUCTS

FIELD OF THE INVENTION

The primary objective of the invention is to provide prefabricated plastic elements that may be quickly assembled on the basement floor, or in advance of the actual duct installation proper. As a general rule, the pattern and size of a proposed duct system would be set forth in the plans. Consequently, the various types and sizes of the contemplated ducts to be included in the system being known, the number and types of the instant connector elements required can be determined and made available in advance.

In accordance with the concepts of the present invention, many of the operations currently performed by workmen standing on ladders and the like can be accomplished on the floor, thus reducing the time factor involved and increasing the safety factor relatively to the workmen. Also, because the present connectors are made of plastic material, the weight of a duct installation will be greatly reduced.

SUMMARY OF THE INVENTION

The invention provides for four types of plastic connector elements, each having generally similar characteristics. Connectors of the first type are adapted for the connection of the adjacent end wall segments of a pair of coplanarly disposed ducts. Connectors of the second type would usually be employed in contiguous pairs, and are also adapted for the connection of the adjacent end wall segments of a pair of coplanarly disposed ducts. Connectors of the third type are adapted for the connection of an end wall segment of a first duct that extends at right angles to a second duct, with an opening-defining wall segment of the second duct. The connectors of the fourth type are adapted for the connection of an end wall segment of a first duct disposed in one plane, and an end wall segment of a second duct disposed in an angular plane relatively to the first duct.

The invention is illustrated on three sheets of drawings that accompany this specification. Objects and advantages not specifically noted hereinbefore, will be apparent or pointed out in the detailed description that will follow with reference to said drawings.

BRIEF DESCRIPTION OF THE DRAWINGS

FIG. 1 is a top plan view of one of a first set of four similar connector elements most frequently employed;

FIG. 2 is a front elevational view of FIG. 1;

FIG. 3 is an enlarged sectional view taken on the line 3—3 of FIG. 1;

FIG. 4 is a top plan view of one of a second set of four similar connector elements frequently employed;

FIG. 5 is a front elevational view of FIG. 4;

FIG. 6 is an enlarged sectional view taken on the line 6—6 of FIG. 4;

FIG. 7 is an enlarged partly sectional isometric view of one of another set of four similar connector elements sometimes employed;

FIG. 8 is an enlarged partly sectional isometric view of a connector element that may be employed in cooperation with the above designated connector elements;

FIG. 9 is a schematic top plan presentation of an exemplary duct system incorporating the FIGS. 3, 6, and 8 type connectors;

FIG. 10 is a side elevational view of FIG. 8;

FIG. 11 is a partly sectional transverse elevational view taken on the line 11—11 of FIG. 10;

FIG. 12 is an enlarged vertical section taken on the line 12—12 of FIG. 11;

FIG. 13 is a partly sectional transverse elevational view taken on the line 13—13 of FIG. 10;

FIG. 14 is an enlarged vertical section taken on the line 14—14 of FIG. 13;

FIGS. 15 and 16 are enlarged horizontal sections taken respectively on the lines 15—15 and 16—16 of FIG. 10;

FIG. 17 is a fragmentary side elevational view of a duct wherein an opening has been formed for the installation of a branch take-off duct;

FIG. 18 is a similar view illustrating the take-off duct applied, the latter being shown in vertical section;

FIG. 19 is a horizontal section taken on the line 19—19 of FIG. 18;

FIG. 20 is a vertical section taken on the line 20—20 of FIG. 18;

FIGS. 21, 22 and 23 are isometric views, with approximate dimensions thereof being indicated, of a number of duct members frequently incorporated in an installation.

DESCRIPTION OF THE PREFERRED EMBODIMENTS

With respect to the drawings, it is to be understood that such terms as "top", "bottom", "right", "left", "front", "vertical", "horizontal" and so on, are employed hereinafter in the interest of descriptive clarity, particularly with reference to the principal views illustrated. That is to say, such terms may not always be apropos when the various elements are shown in an ultimate connector or incorporated in a duct system.

Prior to entering into a detailed description with respect to the connector elements of the invention, attention is directed to FIGS. 21 through 23. The walls of the exemplary conventional ducts there illustrated are made of insulative material such as molded high-density fiber glass, encased in sheeting usually made of aluminum.

In order to more readily identify these ducts as they or portions thereof appear in other views of the drawings, a few reference characters have been applied thereto. Thus: The rectangular duct appearing in FIG. 21 is generally designated RD; the tapered duct appearing in FIG. 22 is generally designated TD; and the elbow duct appearing in FIG. 23 is generally designated ED. Each of the ducts has a top wall $t$, a bottom wall $b$, and opposed side walls $s$.

With reference to FIGS. 1 through 3, the connector element there particularly illustrated is generally designated 30. It includes integrally: a main vertical body portion 32; a pair of opposed horizontally projecting upper branch sections 34; and a pair of opposed horizontally protecting lower branch sections 36; each of said pair of upper and lower branch sections being vertically spaced whereby to provide with the main body portion 32 a pair of opposed cavities each adapted to receive an end wall segment of a duct RD, TD, or EB.

The main body portion 32 terminates at the top in a laterally projecting longitudinal reinforcing flange 38. Certain of the elements 30 have a plurality of longitudinally spaced circular openings 40 formed in said main body portion below the flange 38 thereof, for reasons to be explained.

Preferably as illustrated, the branch sections 36 are longer than their companion branch sections 34, thus facilitating duct insertion into the cavities aforesaid. Each of the four branch sections is provided with one or more longitudinally extending internal barb formations 42, two such formations being preferable and exemplarily shown. Each of the two branch sections 34 is furthermore provided with a longitudinal external screw guide formation 44 located intermediately of the internal barb formations. The opposite ends of the connector 30 are preferably mitered as indicated at 48 in FIG. 2.

With reference to FIGS. 4 through 6, the connector element there particularly illustrated is generally designated 50. It includes integrally: a vertical main body portion 52; a horizontally projecting upper branch section 54; and a horizontally projecting lower branch section 56; said upper and lower branch sections being vertically spaced whereby to provide with the main body portion 52 a cavity adapted to receive an end wall segment of a duct RD, TD, or EB. The main body portion 52 terminates at the top in a laterally projecting longitudinal reinforcing flange 38. Certain of the elements 50 have a plurality of longitudinally spaced circular openings 40 formed in said main body portion below the flange 38 thereof.

Preferably as illustrated, the branch section 56 is longer than its companion branch section 54, thus facilitating duct insertion into the cavity aforesaid. Each of the two branch sections is provided with one or more longitudinally extending internal barb formations 42, and the branch section 54 is furthermore provided with a longitudinal external screw guide formation 44 located intermediately of the two internal barb formations shown. The opposite ends of the connector 50 are also preferably mitered as indicated at 48 in FIG. 5.

With reference now to FIG. 7, the connector element there particularly illustrated is designated 60. It includes integrally: a main body portion 62; a horizontally projecting upper branch section 64; a similar lower branch section 66; a left downwardly projecting branch section 68; and a right downwardly projecting branch section 70; said upper and lower branch sections being vertically spaced whereby to provide with the main body portion a cavity adapted to receive a wall segment of a first duct RD, TD, or EB; said left and right branch sections being horizontally spaced whereby to provide with the main body portion a cavity adapted to receive an end wall segment of a second duct RD or TD, with the second duct being disposed at right angles to the first. Each of the four branch sections 64, 66, 68 and 70 is provided with one or more longitudinally extending internal barb formations 42, and with an external screw guide formation 44 located intermediately of the two internal barb formations shown.

With reference to FIG. 8, the connector element there particularly illustrated is generally designated 80. It includes integrally: dual main body portions 82 that are spaced but joined at the top by a pliable connection or hinge segment 83; a pair of opposed horizontally projecting upper branch sections 84; and a pair of opposed horizontally projecting lower branch sections 86; each of said pair of upper and lower branch sections being vertically spaced whereby to provide with the main body portion a pair of opposed cavities each adapted to receive an end wall segment of a duct RD or TD. As indicated by the similar reference numerals thereto applied, each branch 84 and 86 is provided with one or more longitudinally extending internal barb formations 42, and an external screw guide formation 44.

Although it is believed that, in view of the comprehensive drawings, the manner of utilizing the invention should be apparent to anyone skilled in the art, a brief explanation will be presented below. Prior thereto however, the thus far unidentified items that appear in the drawings will be given reference numerals, and a few pertinent observations made.

Thus, the screws 88 that appear in FIGS. 11 through 16, 19 and 20, are of the self-drilling type. In order to minimize injury to the adjacent duct account slippage by the point of such a screw at the beginning of its insertion, each screw guide formation 44 includes a protuberance portion 90 that extends between the indented guide formation and the free edge of the branch section wherein it is formed, as best seen for example in FIGS. 6, 7 and 8. It is noted that when insertion of the screws 88 is being completed, the pointed edges of the barb formations 42 will first impinge against, and then penetrate into the thereto contiguous surfaces of the duct walls. Thus, said screws cooperate with the barb formations to insure positive retention of the ducts within the cavities.

A completed installation would usually find pairs of connector elements 50 contiguously disposed as shown particularly in FIG. 14, their main body portions 52 being secured together by screws 92. These screws may be of the self-drilling type, or aligned holes for their reception may be formed by means of a hand drill. With reference to FIGS. 17 through 20, the cut-out opening for the illustrated branch take-off is designated 94. In ultimate connectors formed with four of the FIG. 3 type elements 30, eight of the FIG. 6 type elements 50, or four of the FIG. 7 type elements 60, their abutting mitered ends 48 would preferably be tack-welded or glued together. In ultimate connectors formed by four elements 30, only one of them (that being the top one), need have the longitudinally spaced holes 40 formed therein. Likewise, in ultimate connectors formed by eight elements 50, only two of them (these being the two top ones), need be provided with aligned longitudinally spaced holes 40.

A duct system incorporating the connectors of the present invention is suspended by means of hanger wires 96, shown in broken lines in FIG. 11 through 13. The upper ends of these wires will have been anchored to a ceiling or like overhead structure in advance, the appropriate spacing of them having been predetermined, as should be understood. Consequently the requirement for present day strap and pad suspension methods, strap and rail methods, strap and angle methods and so on are eliminated. When an ultimate connector formed with elements 30, or with elements 50 has been placed in proper position, the free lower end portions of the wires 96 would simply be passed through the holes 40 and twisted into knots above the flanges 38. These flanges not only serve in a reinforcing capacity, but also in a protective capacity against damage from the hanger wires to the upper regions of the main body portions 32 and 52 of the top elements.

Use

It will be assumed that FIGS. 9 and 10 suggest a schematic layout for an exemplary portion of a typical air duct system. It will further be assumed that hanger wires 96 had been anchored overhead, the number and spacing of them being readily ascertainable and dependent upon the number of connectors 30 and 50 indicated on a layout. It will also be assumed that as suggested in FIG. 17, appropriate branch take-off openings 94 have been cut in one or both sides *s* of certain ducts RD where and as a particular layout indicates. Such cut-out operations would be performed by workmen on the floor rather than while standing on ladders and the like. Furthermore, a feasible plurality of ducts may be integrated, the screws 88 applied to the included connector elements 30 and 50, and the mitered ends 48 tack-welded or glued together, all of these operations likewise being performed by workmen on the floor.

Generally, a composite unit including a plurality of ducts RD would terminate at the left and right ends thereof in a connector comprised of four elements 50, with the appropriate number of connectors comprised of four elements 30 being interpolated.

A thus formed composite unit may be lifted to proper position beneath the anchored wire hangers 96, the left end connector of one unit being disposed contiguously to the right end connector of a previously hung unit. The free ends of the wires would then be passed through the holes 40 and twisted and the screws 92 applied, such operations ordinarily being the only ones requiring the use of a ladder. Branch takeoff connections, and non-coplanar duct connections may also be effected on the floor and then lifted into position and incorporated in the system, as should now be understood without further elaboration.

The illustrated and described connector elements may obviously be modified in some respects without departure from the novel concepts of the invention. For example in some cases, the elements 30 and 50 may be fabricated with straight instead of mitered ends. It will also be understood that dimensions appearing in the drawings are exemplary only and may be varied. Wherefore the invention is not to be limited to the precise structural details illustrated and described, the scope thereof being limited only by the claims hereunto appended.

What is claimed is:

1. In an air duct system of the character disclosed, said system including duct members connected together that are coplanarly disposed relatively to one another, and duct members that are angularly disposed relatively to one another, and duct members that are disposed at right angles relatively to one another, all of said duct members terminating in rectangular end segments having a top wall, a bottom wall, and opposed side walls, the combination of:

means in cooperation with said end segment walls of a first duct member and with said end segment walls of a second duct member that is coplanarly disposed relatively to the first duct member for operatively connecting these duct members;

means in cooperation with said end segment walls of a first duct member and with said end segment walls of a third duct member that is angularly disposed relatively to the first duct member for operatively connecting these duct members; and means in cooperation with said end segment walls of a first duct member and with the wall portions surrounding a cut-out opening formed in one side wall of a fourth duct member that is disposed at right angles relatively to said first duct member, said means in cooperation with said end segment walls of a first duct member and with said end segment walls of a second duct member that is coplanarly disposed relatively to the first duct member for operatively connecting these duct members comprising a connector composed of four similarly contoured cooperative connector elements that are fabricated of plastic material and have mitered ends secured together whereby to form a hollow unitary connector of rectangular configuration, each connector element including integrally:

a main body portion having a reinforcing flange forming the outer edge thereof;

an outer pair of opposed branch sections projecting laterally from the main body portion at right angles thereto;

an inner pair of opposed branch sections projecting laterally from the main body at right angles thereto, each pair of said opposed branch sections being spaced apart a distance corresponding approximately to the thickness of the end segment walls of said coplanarly disposed duct members, whereby to provide with said main body portion a pair of oppositely opening cavities each adapted to receive an end segment wall of one of the coplanarly disposed duct members;

at least one longitudinally extending internal barb formation provided in each branch section for engaging against the outer surface of a duct member end segment wall entered into one of the cavities aforesaid;

a longitudinally extending external screw guide formed in each outer branch section intermediately of said main body portion and the free extremity of the section, the screw guide formation including an indented portion merging into a protuberance portion; and a plurality of self-drilling type screws inserted along said indented portion of the screw guide formation, said screws serving as their insertion is being completed to first cause said barb formations to impinge against and thereupon to penetrate into the surface of the end segment wall within said cavity, the protuberance portion of the guide formation serving to obviate injury to the adjacent duct wall surface account slippage by the points of the screws at the beginning of the insertion thereof.

2. In an air duct system of the character disclosed, said system including duct members connected together that are coplanarly disposed relatively to one another, and duct members that are angularly disposed relatively to one another, and duct members that are disposed at right angles relatively to one another, all of said duct members terminating in rectangular end segments having a top wall, a bottom wall, and opposed side walls, the combination of:

means in cooperation with said end segment walls of a first duct member and with said end segment walls of a second duct member that is coplanarly disposed relatively to the first duct member for operatively connecting these duct members;

means in cooperation with said end segment walls of a first duct member and with said end segment walls of a third duct member that is angularly disposed relatively to the first duct member for operatively connecting these duct members; and means in cooperation with said end segment walls of a first duct member and with the wall portions surrounding a cut-out opening formed in one side wall of a fourth duct member that is disposed at right angles relatively to said first duct member, for operatively connecting these duct members;

said means in cooperation with said end segment walls of a first duct member and with said end segment walls of a second duct member that is coplanarly disposed relatively to the first duct member for operatively connecting these duct members comprise a pair of similar connectors secured together in peripheral alignment by means of screws, each of said pair of connectors being composed of four similarly contoured cooperative connector elements that are fabricated of plastic material and have mitered ends secured together whereby to form a hollow unitary connector of rectangular configuration, each connector element including integrally:

a main body portion having a reinforcing flange forming the outer edge thereof;

an outer branch section projecting laterally from one side of the main body portion at right angles thereto;

an inner branch section projecting laterally from the same side of the main body portion at right angles thereto, said branch sections being spaced a distance corresponding approximately to the thickness of the end segment walls of said coplanarly disposed duct members whereby to provide with said main body portion a cavity adapted to receive an end segment wall of one of said coplanarly disposed duct members;

at least one longitudinally extending internal barb formation provided in each branch section for engaging against the outer surface of a duct member end segment wall entered into said cavity;

a longitudinally extending external screw guide formed in each outer branch section intermediately of said main body portion and the free extremity of the section, the screw guide formation including an indented portion merging into a protuberance portion; and a plurality of self-drilling type screws inserted along said indented portion of the screw guide formation, said screws serving as their insertion is being completed to first cause said barb formation to impinge against and to thereupon penetrate into the surface of the end segment wall within said cavity, the protuberance portion of the guide formation serving to obviate injury to the adjacent duct wall surface account slippage by the points of the screws at the beginning of the insertion thereof.

3. In an air duct system of the character disclosed, said system including duct members connected together that are coplanarly disposed relatively to one another, and duct members that are angularly disposed relatively to one another, and duct members that are disposed at right angles relatively to one another, all of said duct members terminating in rectangular end segments having a top wall, a bottom wall, and opposed side walls, the combination of:

means in cooperation with said segment walls of a first duct member and with said end segment walls of a second duct member that is coplanarly disposed relatively to the first duct member for operatively connecting these duct members;

means in cooperation with said end segment walls of a first duct member and with said end segment walls of a third duct member that is angularly disposed relatively to the first duct member for operatively connecting these duct members; and means in cooperation with said end segment walls of a first duct member and with the wall portions surrounding a cut-out opening formed in one side wall of a fourth duct member that is disposed at right angles relatively to said first duct member for operatively connecting these duct members;

said means in cooperation with said end segment walls of a first duct member and said end segment walls of a third duct member that is angularly disposed relatively to the first duct member for operatively connecting these duct members comprising a connector composed of four similarly contoured cooperative connector elements that are fabricated of plastic material and have mitered ends secured together whereby to form a hollow unitary connector of rectangular configuration, each connector element including integrally:

two longitudinally spaced similar main body portions connected by an intermediate peripheral pliable hinge segment;

an outer branch section projecting laterally from each main body portion at right angles thereto;

an inner branch section projecting laterally from each main body portion at right angles thereto, said branch sections being spaced apart a distance corresponding approximately to the thickness of the end segment walls of said angularly disposed duct members, whereby to provide with said main body portions a pair of oppositely opening cavities each adapted to receive an end segment wall of one of the angularly disposed duct members;

a longitudinally extending external screw guide formed in each branch section, the screw guide formation including an indented portion merging into a protuberance portion;

at least one longitudinally extending internal barb formation provided in each branch section for engaging against the outer surface of a duct member end segment wall entered into one of said cavities; and a plurality of self-drilling type screws inserted along said indented portion of the screw guide formation, said screws serving as their insertion is being completed to first cause said barb formations to impinge against and thereupon to penetrate into the surface of the end segment wall within said cavity, the protuberance portion of the guide formation serving to obviate injury to the adjacent duct wall surface account slippage by the points of the screws at the beginning of the insertion thereof.

4. In an air duct system of the character disclosed, said system including duct members connected together that are coplanarly disposed relatively to one another, and duct members that are angularly disposed relatively to one another, and duct members that are disposed at right angles relatively to one another, all of said duct members terminating in rectangular end segments having a top wall, a bottom wall, and opposed side walls, the combination of:

means in cooperation with said end segment walls of a first duct member and with said end segment walls of a second duct member that is coplanarly disposed relatively to the first duct member for operatively connecting these duct members;

means in cooperation with said end segment walls of a first duct member and with said end segment walls of a third duct member that is angularly disposed relatively to the first duct member for operatively connecting these duct members; and means in cooperation with said end segment walls of a first duct member and with the wall portions surrounding a cut-out opening formed in one side wall of a fourth duct member that is disposed at right angles relatively to said first duct member for operatively connecting these duct members;

said means in cooperation with said end segments walls of a first duct member and with the side wall portions surrounding a cut-out opening formed in one side wall of a fourth duct member that is disposed at right angles to said first duct member comprising a connector composed of four similarly contoured cooperative connector elements that are fabricated of plastic material and have mitered ends secured together whereby to form a hollow unitary connector of rectangular configuration, each connector element including integrally:

a right angular main body portion;

a first outer branch section projecting at right angles thereto and merging into the end of a first leg of the main body portion;

a first inner branch section parallel therewith and merging into the end of the second leg of the main body portion, said branch sections being spaced apart a distance corresponding approximately to the thickness of the end segment walls of said first duct member, whereby to provide with said main body portion a cavity adapted to receive an end segment wall of said duct member;

a second outer branch section projecting laterally therefrom and merging into the corner portion of said main body portion;

a second inner branch section projecting laterally therefrom and merging into the end of said second leg of the main body portion, said branch sections being spaced apart a distance corresponding approximately to the thickness of the wall portions surrounding a cut-opening formed in one side wall of second duct member, whereby to provide with said main body portion a cavity adapted to receive one segment of said opening surrounding wall;

at least one logitudinally extending internal barb formation provided in each branch section for engaging against the outer surface of a duct member wall segment entered into one of said cavities;

a longitudinally extending external screw guide formed in each branch section, the screw guide formation including an indented portion merging into a protuberance portion; and a plurality of self-drilling type screws inserted along said indented portion of the screw guide formation, said screws serving as their insertion is being completed, to first cause the barb formations to impinge against and thereupon to penetrate into the surface of the wall segment entered into said cavity, the protuberance portion of the guide formation serving to obviate injury to the adjacent duct wall surface account slippage by the points of the screws at the beginning of the insertion thereof.

* * * * *